US012732473B2

(12) United States Patent
Wu et al.

(10) Patent No.: US 12,732,473 B2
(45) Date of Patent: Sep. 8, 2026

(54) MEDIA CONTENT SENDING METHOD AND APPARATUS, AND DEVICE, READABLE STORAGE MEDIUM AND PRODUCT

(71) Applicant: Beijing Zitiao Network Technology Co., Ltd., Haidian District (CN)

(72) Inventors: Yiying Wu, Beijing (CN); Daoyu Wang, Beijing (CN); Hui Sun, Beijing (CN); Ziyang Zheng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 208 days.

(21) Appl. No.: 18/573,926

(22) PCT Filed: Oct. 31, 2022

(86) PCT No.: PCT/CN2022/128530

§ 371 (c)(1),
(2) Date: Dec. 22, 2023

(87) PCT Pub. No.: WO2023/072280

PCT Pub. Date: May 4, 2023

(65) Prior Publication Data

US 2024/0267349 A1 Aug. 8, 2024

(30) Foreign Application Priority Data

Nov. 1, 2021 (CN) ......................... 202111284766.3

(51) Int. Cl.
*H04L 51/10* (2022.01)
*G06F 3/0482* (2013.01)
(Continued)

(52) U.S. Cl.
CPC ............ *H04L 51/10* (2013.01); *H04L 51/046* (2013.01); *G06F 3/0482* (2013.01); *G06F 3/0484* (2013.01)

(58) Field of Classification Search
CPC ..... H04L 51/10; H04L 51/046; G06F 3/0482; G06F 3/0484
See application file for complete search history.

(56) References Cited

U.S. PATENT DOCUMENTS 9,979,767 B2 * 5/2018 Williams .............. H04L 65/764
10,915,705 B1 2/2021 Wehrman et al.
(Continued)

FOREIGN PATENT DOCUMENTS

CN 103841008 A 6/2014
CN 105991690 A 10/2016
(Continued)

OTHER PUBLICATIONS

ISA China National Intellectual Property Administration, International Search Report and Written Opinion Issued in Application No. PCT/CN2022/128530, Jan. 12, 2023, WIPO, 12 pages.

*Primary Examiner* — Minh Chau Nguyen
(74) *Attorney, Agent, or Firm* — Alleman Hall LLP

(57) ABSTRACT

This disclosure provides a media content sending method, apparatus, device, readable storage medium and product. The method comprises: in a first sending path, in response to an editing completion operation on media content materials, displaying a media content processing interface on a display interface; in response to a received target sending path selection operation, determining a target sending path corresponding to media content, wherein the target sending path comprises a first sending path or a second sending path, the first sending path is configured to post the content of a target application or the first sending path is an instant messaging path, and the second sending path is a sending path that is different in type from the first sending path and independent of the first sending path; generating the media
(Continued)

content on the basis of the media content materials, and sending the media content to the target sending path.

20 Claims, 6 Drawing Sheets

(51) Int. Cl.
*G06F 3/0484* (2022.01)
*H04L 51/046* (2022.01)

(56) References Cited

U.S. PATENT DOCUMENTS

2009/0100468 A1* 4/2009 Shaffer .................. H04N 7/163 725/41
2017/0012884 A1* 1/2017 Ho ........................ H04L 67/141
2020/0145339 A1* 5/2020 Ho ........................ H04L 47/263

FOREIGN PATENT DOCUMENTS

| | | | |
|---|---|---|---|
| CN | 106533900 | A | 3/2017 |
| CN | 108259318 | A | 7/2018 |
| CN | 108471378 | A | 8/2018 |
| CN | 109445963 | A | 3/2019 |
| CN | 109769127 | A | 5/2019 |
| CN | 109995581 | A | 7/2019 |
| CN | 109996123 | A | 7/2019 |
| CN | 111273832 | A | 6/2020 |
| CN | 113946251 | A | 1/2022 |
| WO | 2017109478 | A1 | 6/2017 |

* cited by examiner

81

Display module

82

Determination module

83

Sending module

Media content sending apparatus

MEDIA CONTENT SENDING METHOD AND APPARATUS, AND DEVICE, READABLE STORAGE MEDIUM AND PRODUCT

CROSS-REFERENCES TO RELATED APPLICATIONS

The present application is a U.S. National Stage Application of PCT Application Serial No. PCT/CN2022/128530, filed on Oct. 31, 2022, which claims priority to Chinese Patent application Ser. No. 20/2111284766.3, titled "MEDIA CONTENT SENDING METHOD AND APPARATUS, AND DEVICE, READABLE STORAGE MEDIUM AND PRODUCT" field on Nov. 1, 2021, the contents of the application being incorporated herein by reference.

FIELD

Embodiments of the present disclosure relates to the technical field of data processing, and more specifically, relates to a media content sending method, apparatus, device, readable storage medium, and product.

BACKGROUND

In order to entertain users in their spare time, software that plays media content has gradually entered users' lives, such as video software. Users can record their lives by shooting and sending videos on video software.

In video applications, after a user finish shooting a video, he/she can send the video to the platform by triggering the preset send icon, so that other users can view the video sent by that user.

SUMMARY

Embodiments of the present disclosure provide a media content sending method, apparatus, device, readable storage medium, and product.

In accordance with a first aspect, embodiments of the present disclosure provide a method of sending media content, comprising:

In a first sending path, in response to an editing completion operation on media content materials, displaying a media content processing interface on a display interface;

In response to a target sending path selection operation that is received on the media content processing interface, determining a target sending path corresponding to media content, wherein the target sending path comprises a first sending path or a second sending path, the first sending path is configured to post content of the target application or the first sending path is an instant messaging path, and the second sending path is a sending path that is different from the first sending path in terms of type and independent of the first sending path; and Generating the media content on the basis of the media content materials, and sending the media content to the target sending path.

In accordance with a second aspect, embodiments of the present disclosure provide an apparatus of sending media content, comprising:

A display module, configured to, in a first sending path, in response to an editing completion operation on media content materials, display a media content processing interface on a display interface;

A determination module, configured to, in response to a received target sending path selection operation that is received on the media content processing interface, determine a target sending path corresponding to media content, wherein the target sending path comprises a first sending path or a second sending path, the first sending path is configured to post content of the target application or the first sending path is an instant messaging path, and the second sending path is a sending path that is different from the first sending path in terms of type and independent of the first sending path; and A sending module, configured to generate the media content on the basis of the media content materials, and send the media content to the target sending path.

In accordance with a third aspect, embodiments of the present disclosure provide an electronic device, comprising: a processor and a memory;

The memory stores computer executable instructions;

The processor executes the computer executable instructions stored in the memory, causing the at least one processor to implement the method of sending media content according to the first aspect and various possible designs of the first aspect.

In accordance with a fourth aspect, embodiments of the present disclosure provide a computer-readable storage medium, wherein the computer-readable storage medium stores computer executable instructions, and when a processor executes the computer executable instructions, the method of sending media content according to the first aspect and various possible designs of the first aspect is implemented.

In accordance with a fifth aspect, embodiments of the present disclosure provide a computer program product comprising a computer program, wherein when the computer program is executed by a processor, the method of sending media content according to the first aspect and various possible designs of the first aspect is implemented.

In accordance with a sixth aspect, embodiments of the present disclosure provide a computer program, wherein when a processor executes the computer program, the method of sending media content according to the first aspect and various possible designs of the first aspect is implemented.

BRIEF DESCRIPTION OF THE DRAWINGS

In order to explain the embodiments of the present disclosure or the technical solutions in the prior art more clearly, the following will briefly introduce the drawings needed for describing the embodiments or the prior art. It will be apparent that the drawings in the following description are of some embodiments of the present disclosure. For those skilled in the art, other drawings can be derived from these drawings without exerting creative efforts.

DETAILED DESCRIPTION OF EMBODIMENTS

Figure 1:
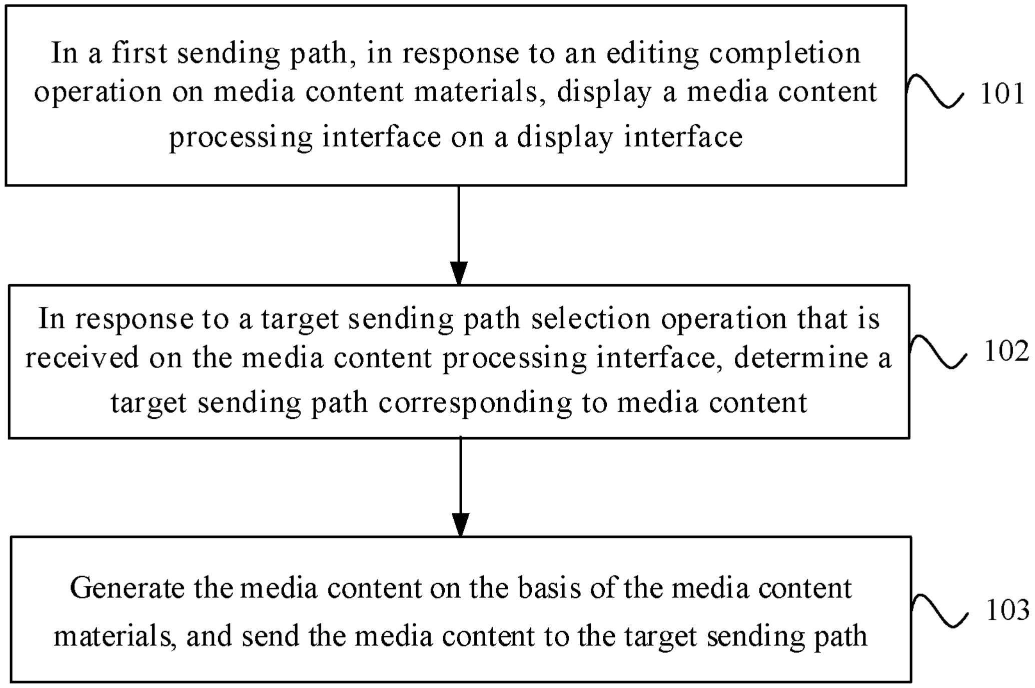
FIG. 1 is a schematic flowchart of a media content sending method provided by embodiment 1 of the present disclosure.

In order to make the purposes, technical solutions and advantages of the embodiments of the present disclosure more clear, the technical solutions in the embodiments of the present disclosure will be clearly and completely described below in conjunction with the drawings in the embodiments of the present disclosure. Obviously, the described embodiments are some, but not all, of the embodiments of the present disclosure. Based on the embodiments in the present disclosure, all other embodiments obtained by those skilled in the art without making creative efforts fall within the scope of protection of the present disclosure.

In video applications, after a user finish shooting a video, he/she can send the video to the platform by triggering the preset send icon, so that other users can view the video sent by that user. In view of the problem that the existing media content sending method can only send videos to the original path and cannot meet the user's needs for sending video in different scenarios, the present disclosure provides a media content sending method, apparatus, device, readable storage medium, and product.

It should be noted that the media content sending method, apparatus, device, readable storage medium, and product provided by the present disclosure can be applied in any scenario of sending media content.

Existing media content processing methods, after completing the processing of media content materials, can only directly send the media content to the original channel where it entered the editing process. If a user wants to send the completed video to other sending channels, he or she needs to re-shoot the video, or needs to save the completed video locally and then switches to other sending channels for the sending operation. For example, the user can directly send the media content to a public channel for other users to view, or the user can only save the media content to a preset storage path, and call the media content from the storage path to send to the instant messaging path. The above methods are often complicated to operate and cannot meet the sending needs of users in different scenarios.

In the process of solving the above technical problems, through researching, the inventor found that in order to make the sending path of media content more diversified and meet different sending needs of users, when the user complete the production of media content materials in the first sending channel, he or she may select the current target sending path on the media content sending page according to actual needs, and send the synthesized media content to the target sending path. As a result, users may send the edited media content to a new sending path, and the new sending path does not depend on whether the work has been sent or saved on the original sending path, meeting the needs of users in different scenarios. In addition, in the first sending path, the current sending path may be changed according to the user's selection operation, making the operation more flexible.

FIG. 1 is a schematic flowchart of a media content sending method provided by embodiment 1 of the present disclosure. As shown in FIG. 1, in a target application, the method comprises:

Step 101: in a first sending path, in response to an editing completion operation on media content materials, display a media content processing interface on a display interface.

The execution subject of the present embodiment is a media content sending apparatus. The media content sending apparatus may be coupled in a terminal device, and the terminal device is capable of human-computer interaction with users. The media content sending apparatus may determine a target sending path based on the user's human-computer interaction operation and send the media content to the target sending path.

Optionally, the media content sending apparatus may also be coupled in a server. The server may be communicatively connected to a terminal device capable of human-computer interaction, determine a target sending path according to the instructions sent by the terminal device, and send the media content to the target sending path.

In the present embodiment, after the user completes an editing operation of the media content materials, an editing completion operation of the media content materials may be triggered. Wherein the editing completion operation may be accomplished by triggering a preset editing completion icon on the display interface, or may be accomplished by the user displaying a preset biometric feature. Optionally, a media content material editing completion icon may be set on the display interface, and the user may trigger the editing completion operation by triggering the editing completion icon. Optionally, the editing completion operation may also be triggered through gesture control or through expression control with the user's full authorization. Specifically, the user's current image information may be obtained with the user's knowledge and authorization, and a gesture recognition and/or an expression recognition may be performed on the image information. When the user's current gesture and/or expression matches a preset trigger expression, the editing completion operation is triggered.

After obtaining the editing completion operation triggered by the user, in the first sending path, the media content processing interface may be displayed on the display interface. The media content processing interface is specifically used for further data processing of the media content and for determining the target sending path of the media content.

Wherein the media content materials comprise audio and video resource data, editing resource data, and corresponding descriptive file data.

Optionally, the media content materials may be audio and video resource data, editing resource data, and corresponding descriptive file data, or the media content materials may only be audio and video resource data, or the media content material may be audio and video resource data and corresponding descriptive file data, or the media content materials may also be text data input by the user. The present disclosure does not make limitations on this.

Optionally, the user may further perform editing operations on the media content materials. The media content sending apparatus may obtain editing instructions input by the user, where the editing instructions include one or more of size adjustment parameters, color adjustment parameters, sticker information, and filter information. And editing operations may be performed on the media content materials according to the editing instructions.

Step 102: in response to a target sending path selection operation that is received on the media content processing interface, determine a target sending path corresponding to media content. The target sending path comprises a first sending path or a second sending path, wherein the first sending path is configured to post content of the target application or the first sending path is an instant messaging path, and the second sending path is a sending path that is different from the first sending path in terms of type and independent of the first sending path.

In the present embodiment, in the media content processing interface, the user may perform target sending path selection operation, and according to the user's selection operation, the target sending path corresponding to the media content is determined. Wherein the target sending path comprises a first sending path or a second sending path. The first sending path is configured to post the content of a target application or the first sending path is an instant messaging path. The second sending path is a sending path that is different from the first sending path in terms of type and is independent of the first sending path.

Optionally, when the first sending path is configured to post the content of the target application, the second sending path is an instant messaging path. When the first sending path is an instant messaging path, the second sending path is configured to post the content of the target application.

Wherein publishing the content of the target application includes but is not limited to: sending media content to a public path for other users to view; sending media content to a preset circle of friends for friends in the circle to view; sending the media content and blocking selected friends, etc.

It should be noted that, the target sending path may be different from the first sending path. Through the above method, the sending path may be quickly switched within the first sending path, and the operation is relatively convenient. Alternatively, the target sending path may be the same as the first sending path, that is, the user's selection operation does not change the current sending path. Alternatively, the target sending path may also include a first sending path and a second sending path at the same time, that is, the media content may be sent to the first sending path and the second sending path simultaneously according to the user's selection operation.

Step 103: generate the media content on the basis of the media content materials, and send the media content to the target sending path.

In the present embodiment, due to the needs of different sending paths for media content are different, the media content materials may also be generated before sending the media content to obtain the media content. The generated media content is sent to the target sending path.

The media content sending method provided by the present embodiment displays a media content processing interface on a display interface in response to triggering operation on a media content material editing completion icon in a first sending path. In the media content processing interface, users may determine a target sending path of the current media content materials according to actual needs. Wherein the target sending path comprises a first sending path or a second sending path. The first sending path is configured to post the content of a target application or the first sending path is an instant messaging path, and the second sending path is a sending path that is different from the first sending path in terms of type and independent of the first sending path. Generate the media content materials as media content, and sending the media content to the target sending path. Therefore, users are able to send the edited media content to a new sending path, and the new sending path does not depend on whether the work has been sent or saved on the original sending path, thereby meeting the needs of users in different scenarios. In addition, since in the first sending path, the current sending path may be changed according to user's selection operation, causing the operation of switching the media content sending channels more flexible, which improves user experience.

Further, on the basis of embodiment 1, the media content processing interface comprises a share icon, and step 102 comprises:

In response to a triggering operation on the share icon, display a path selection interface on the display interface, wherein the path selection interface comprises the first sending path and the second sending path.

In response to a triggering operation on the path selection interface, determine the sending path selected by a user as the target sending path.

In the present embodiment, in order to achieve the selection operation of the target sending path, a share icon may be provided on the media content processing interface. When the user needs to perform the selection operation of the sending path, the share icon can be triggered.

After obtaining user's triggering operation on the share icon, in response to the triggering operation, a path selection interface may be displayed on the display interface, wherein the path selection interface includes a first sending path and a second sending path. The user may choose the path they currently want to send based on actual needs. The sending path selected by the user may be determined as the target sending path in response to the user's triggering operation on the path selection interface.

Optionally, if the user does not trigger the share icon, the media content may be sent to the first sending path according to the sending operation triggered by the user.

Figure 2:
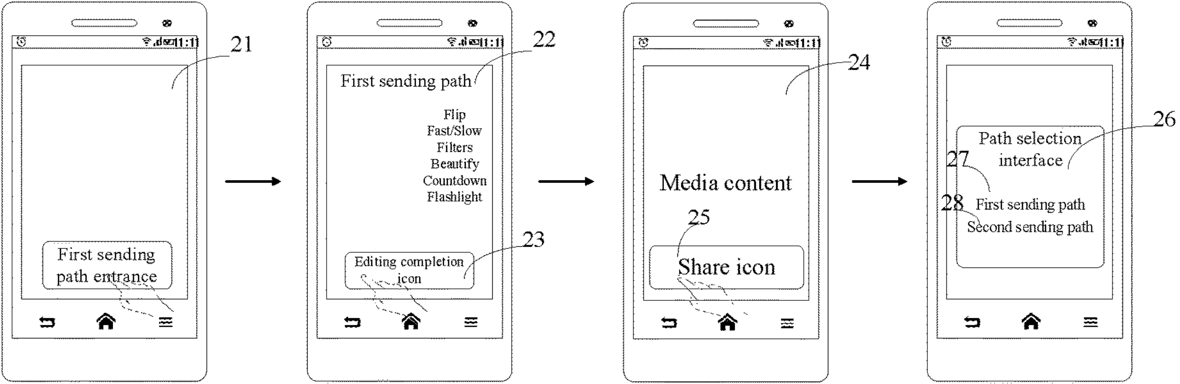
FIG. 2 is a schematic diagram of an interface interaction provided by embodiments of the present disclosure.

FIG. 2 is a schematic diagram of an interface interaction provided by embodiments of the present disclosure. As shown in FIG. 2, the user may enter a first sending path generation page 22 by triggering a first sending path entrance 21 icon, and the user may perform a generation operation of media content materials in the media content material generation page 22 of the first sending path. The media content material generation page 22 is also provided with an editing completion icon 23. The user may enter a media content processing interface 24 by triggering the editing completion icon 23. The media content processing interface 24 includes a share icon 25. The user may select the target sending path by triggering the share icon 25. Specifically, after the share icon 25 is triggered, a path selection interface 26 may be displayed on the display interface, wherein the path selection interface 26 includes a first sending path 27 and a second sending path 28. Therefore, users may select and switch the sending path according to actual needs.

The media content sending method provided by the present embodiment, comprises setting the share icon on the display interface, and based on the triggering operation on the share icon, displaying the path selection interface on the display interface, whereby users may select the target sending path in the path selection interface, and may flexibly switch the sending path to meet the needs for sending media content in different scenarios.

Optionally, on the basis of embodiment 1, the media content processing interface comprises a first sending path share icon and a second sending path share icon.

Step 102 Comprises:

In response to a triggering operation on the first sending path share icon or the second sending path share icon, determine the first sending path or the second sending path corresponding to the first sending path share icon or the second sending path share icon as the target sending path.

In the present embodiment, in order to implement the selection operation of the target sending path, the media content processing interface may set share icons corresponding to multiple distributable paths according to all current available sending paths. Specifically, the media content processing interface comprises a first sending path share icon and a second sending path share icon. The user may trigger the first sending path share icon or the second sending path share icon according to actual needs. The media content sending apparatus may in response to a user's triggering operation on the first sending path share icon or the second sending path share icon, determine the first sending path corresponding to the first sending path share icon or the second sending path corresponding to the second sending path share icon as the target sending path.

Optionally, since the media content processing interface is displayed according to a triggering operation by the user in the first sending path, if the user's triggering operation on the first sending path share icon or the second sending path share icon is not detected, it can be determined that the user does not need to switch the sending path at present. Therefore, the media file may be sent to the first sending path.

Figure 3:
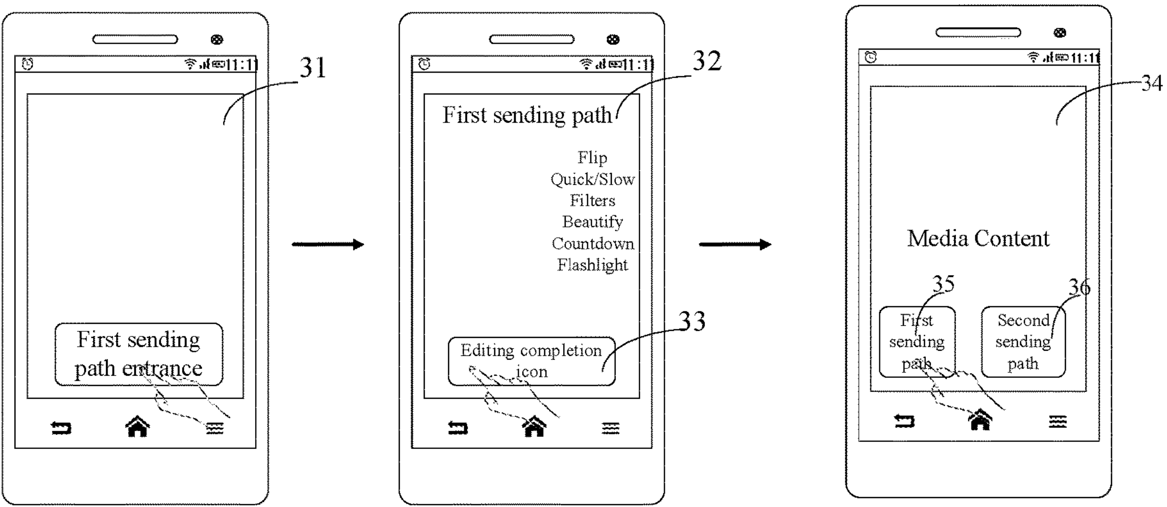
FIG. 3 is a schematic diagram of a display interface provided by embodiments of the present disclosure.

FIG. 3 is a schematic diagram of a display interface provided by embodiments of the present disclosure. As shown in FIG. 3, the user may enter a first sending path generation page 32 by triggering a first sending path entrance 31 icon, and the user may perform a generation operation of media content materials in the media content material generation page 32 of the first sending path. The media content material generation page 32 is also provided with an editing completion icon 33. The user may enter a media content processing interface 34 by triggering the editing completion icon 33. The media content processing interface 34 includes a first sending path share icon 35 and a second sending path share icon 36. The user may trigger the first sending path share icon 35 and the second sending path share icon 36 according to actual needs, to determine the current target sending path.

The media content sending method provided by the present embodiment provides the first sending path share icon and the second sending path share icon on the display interface, whereby the user may process the first sending path share icon or the second sending path share icon according to actual needs, and may flexibly switch the sending path to meet the needs for sending media content in different scenarios.

Figure 4:
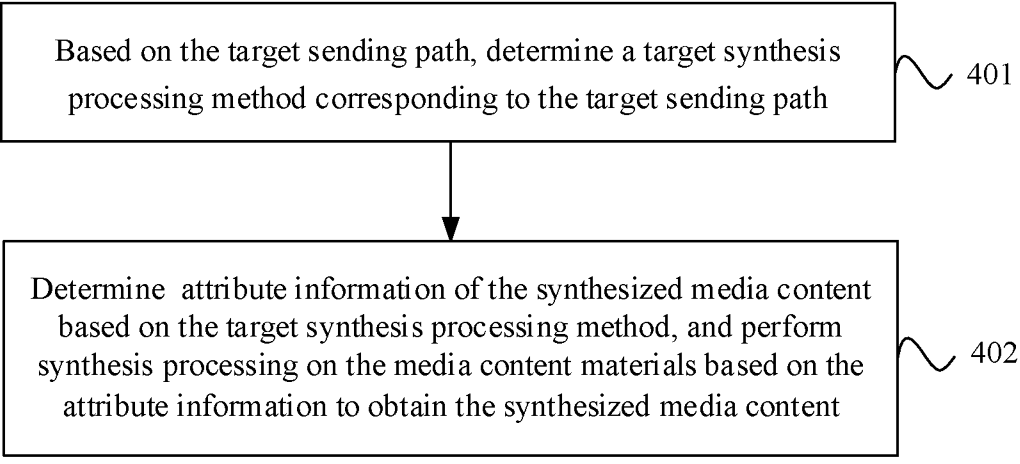
FIG. 4 is a schematic flowchart of a media content sending method provided by embodiment 2 of the present disclosure.

FIG. 4 is a schematic flowchart of a media content sending method provided by embodiment 2 of the present disclosure. On the basis of embodiment 1, in step 103, generating the media content on the basis of the media content materials comprises:

- Step 401: based on the target sending path, determine a target synthesis processing method corresponding to the target sending path;
- Step 402: determine attribute information of the synthesized media content based on the target synthesis processing method, and perform synthesis processing on the media content materials based on the attribute information to obtain the synthesized media content.

In the present embodiment, according to the sending needs corresponding to different sending paths, different synthesis processing methods may be set for media content materials for different sending paths. After determining the target sending path, the target synthesis processing method corresponding to the target sending path may be determined based on the target sending path.

Further, the attribute information of the synthesized media content may be determined according to the target synthesis processing method, and the synthesis processing is performed on the media content materials based on the attribute information to obtain the synthesized media content. Wherein the attribute information of the media content comprises storage-related attribute information and/or transmission-related attribute information. Further, the attribute information of the media content may comprise: a file format, a file size, a resolution, a video encoding format, etc.

According to different sending requirements of the media content, the attribute information of the media content may be adjusted to make the synthesized media content more suitable for actual needs.

Taking practical applications as an example, the attribute information of the media content may include the file size. When the target sending path is an instant messaging path, the instant messaging path may be used to send the synthesized media content to the conversation of the contact selected by the user. Therefore, in order to improve the sending speed of media content, the file size of the synthesized media content may be controlled to be smaller than a preset threshold. When the target sending path is configured to post the content of the target application, in order to ensure the quality of the sent media content, the file size of the synthesized media content may be controlled to be larger than a preset threshold.

The media content sending method provided by the present embodiment comprises generating media content materials based on the attribute information corresponding to the target sending path, thereby enabling the generated media content to match the target sending path, causing the generated media content attributes adapt to the storage and transmission of the corresponding path, and improving the sending efficiency of the media content.

Figure 5:
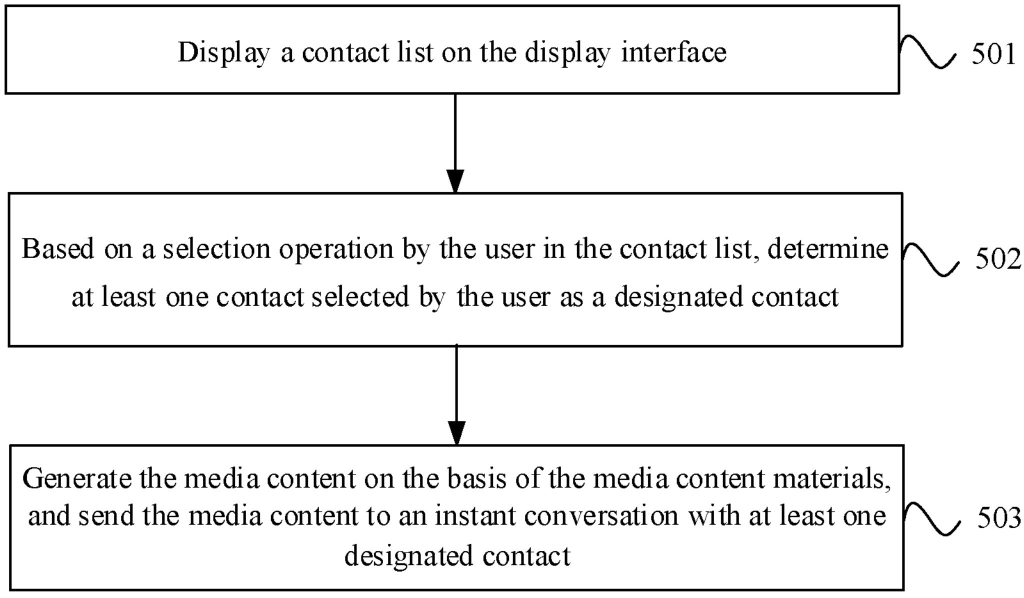
FIG. 5 is a schematic flowchart of a media content sending method provided by embodiment 3 of the present disclosure.

FIG. 5 is a schematic flowchart of a media content sending method provided by embodiment 3 of the present disclosure. On the basis of any one of the above embodiments, the target sending path is an instant messaging path, and after step 102, the method further comprises:

- Step 501: display a contact list on the display interface;
- Step 502: based on a selection operation by the user in the contact list, determine at least one contact selected by the user as a designated contact.

Step 103 Comprises:

- Step 503: generate the media content on the basis of the media content materials, and send the media content to an instant conversation with at least one designated contact.

In the present embodiment, when the target sending path is an instant messaging path, the user may further make selection on the contact. After determining that the target sending path is an instant messaging path, a contact list may be displayed on the display interface, wherein the contact list includes multiple contact identifications for the user to select. The user may select from multiple contact identifications according to actual needs, and may determine at least one contact selected by the user as the designated contact. After determining the designated contact person, the media content sending apparatus may generate the media content materials as the media content, and send the media content to the instant conversation of at least one designated contact person.

Optionally, after sending the media content to the instant conversation of at least one designated contact, a prompt message may also be sent to the designated contact to prompt the designated contact to view the media content.

Figure 6:
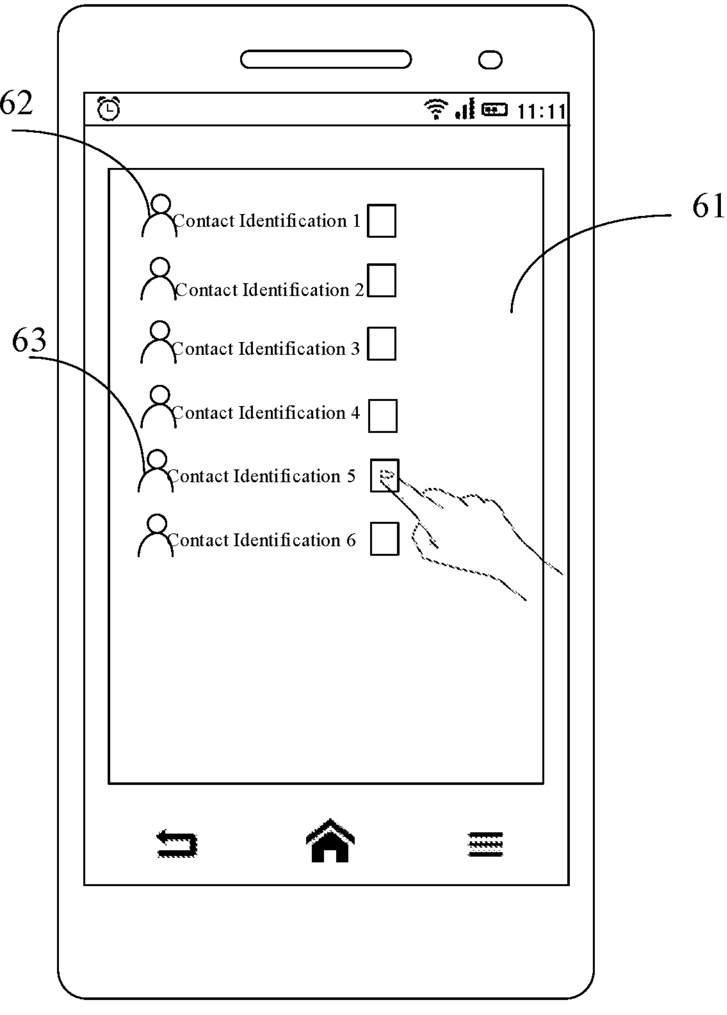
FIG. 6 is a schematic diagram of another interface interaction provided by embodiments of the present disclosure.

FIG. 6 is a schematic diagram of another interface interaction provided by embodiments of the present disclosure. As shown in FIG. 6, after the user determines the instant messaging path as the target sending path, a contact list 61 may be displayed on the display interface, wherein the contact list 61 includes a plurality of contact identifications 62 for the user to select. The user may select at least one contact from the plurality of contact identifications according to actual needs to determine as the designated contact 63.

Further, on the basis of any one of the above embodiments, after step 502, the method further comprises:

Display a shareable channel corresponding to the designated contact on the display interface, wherein the shareable channel comprises at least one of an instant messaging channel of the target application or a channel of a third-party application.

Step 103 Comprises:

In response to a selection operation on the shareable channel by the user, send the media content to a target share channel selected by the user.

In the present embodiment, for each designated contact, it is possible to support sending media content to different shareable channels of the designated contact. Wherein the shareable channels include at least one of: the instant messaging channel of the target application, or the channel of a third-party application.

In order to implement the selection operation of shareable channels, the shareable channels corresponding to the designated contact may be displayed on the display interface. Users may choose shareable channels based on actual needs. In response to the selection operation on the shareable channels, the media content may be sent to the target share channel selected by the user.

Figures 7, 8:
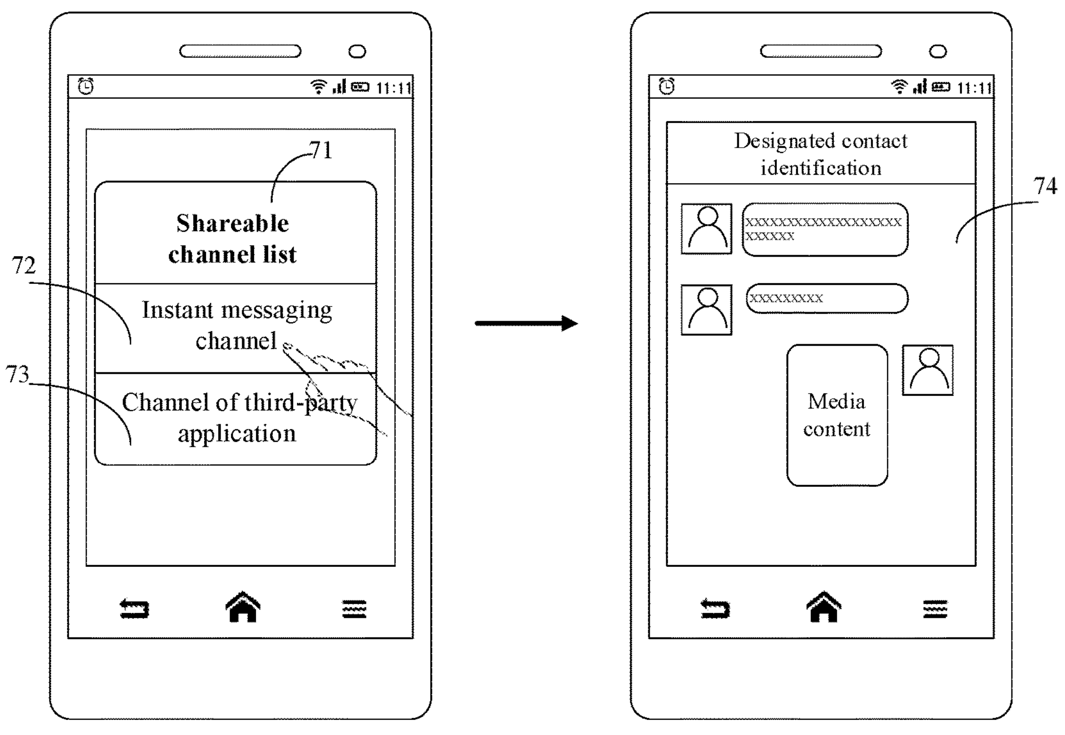
FIG. 7 is a schematic diagram of another interface interaction provided by embodiments of the present disclosure.
FIG. 8 is a structural schematic diagram of a media content sending apparatus provided by embodiment 4 of the present disclosure.

FIG. 7 is a schematic diagram of another interface interaction provided by embodiments of the present disclosure. As shown in FIG. 7, the display interface may also display a shareable channel list 71 corresponding to the designated contact, where the shareable channels include an instant messaging channel 72 of the target application, a channel 73 of the third-party application. When the user selects the instant messaging channel 72 of the target application as the target sharing channel, the media content may be sent to the instant messaging channel 72 of the target application, and the page jumps to a chat interface 74 with the designated contact.

Further, on the basis of any one of the above embodiments, after step 103, the method further comprises:

When a quantity of the designated contact is one, jumping the display interface to a chat interface with the designated contact, or jumping the display interface to a message detail page; and When the quantity of the designated contacts is two, jumping the display interface to the message detail page.

In the present embodiment, when the quantity of designated contact is one, in order to facilitate further communication between the user and the designated contact, after sending the media content, the display page may be jumped to the chat interface with the designated contact. Optionally, the display interface may also be jumped to the message detail page, so that the user may view the chat interface in the message detail page.

When the quantity of designated contacts is at least two, in order to facilitate the user to further communicate with the designated contacts, the display page may be jumped to the message detail page, so that the user may view the chat interface in the message detail page.

The method of sending media content provided by the present embodiment displays a contact list on the display interface, whereby the user may select the designated contacts to whom the media content needs to be sent according to their actual needs, thus improving the efficiency of sending media content and meeting the personalized needs of the user.

FIG. 8 is a structural schematic diagram of a media content sending apparatus provided by embodiment 4 of the present disclosure. As shown in FIG. 8, in the target application, the apparatus comprises: a display module 81, a determination module 82, and a sending module 83. Wherein the display module 81 is configured to, in a first sending path, in response to an editing completion operation on media content materials, display a media content processing interface on a display interface. The determination module 82 is configured to, in response to a received target sending path selection operation that is received on the media content processing interface, determine a target sending path corresponding to media content, wherein the target sending path comprises a first sending path or a second sending path, the first sending path is configured to post content of the target application or the first sending path is an instant messaging path, and the second sending path is a sending path that is different from the first sending path in terms of type and independent of the first sending path. The sending module 83 is configured to generate the media content on the basis of the media content materials, and send the media content to the target sending path.

Further, on the basis of embodiment 4, the first sending path is configured to post the content of the target application and the second sending path is an instant messaging path, or the first sending path is an instant messaging path and the second sending path is configured to post the content of the target application.

Further, on the basis of embodiment 4, the media content materials comprise audio and video resource data, editing resource data, and corresponding descriptive file data.

Further, on the basis of embodiment 4, the media content processing interface comprises a share icon. The determination module is configured to: in response to a triggering operation on the share icon, display a path selection interface on the display interface, wherein the path selection interface comprises the first sending path and the second sending path; and in response to a triggering operation on the path selection interface, determine the sending path selected by a user as the target sending path.

Further, on the basis of embodiment 4, the media content processing interface comprises a first sending path share icon and a second sending path share icon. The determination module is configured to: in response to a triggering operation on the first sending path share icon or the second sending path share icon, determine the first sending path or the second sending path corresponding to the first sending path share icon or the second sending path share icon as the target sending path.

Further, on the basis of embodiment 4, the sending module is configured to: based on the target sending path, determine a target synthesis processing method corresponding to the target sending path; determine attribute information of the synthesized media content based on the target synthesis processing method, and perform synthesis processing on the media content materials based on the attribute information to obtain the synthesized media content.

Further, on the basis of embodiment 4, the attribute information of the media content comprises storage-related attribute information and/or transmission-related attribute information.

Further, on the basis of embodiment 4, the attribute information of the media content comprises at least one of the following: a file format, a file size, a resolution, or a video encoding format.

Further, on the basis of any one of the above embodiments, the apparatus further comprises: the display module, further configured to display a contact list on the display list; the determination module, further configured to, based on a selection operation by the user in the contact list, determine at least one contact selected by the user as a designated contact; and the sending module, configured to: generate the media content on the basis of the media content materials, and send the media content to an instant conversation with at least one designated contact.

Further, on the basis of any one of the above embodiments, the apparatus further comprises: the display module, further configured to display a shareable channel corresponding to the designated contact on the display interface, wherein the shareable channel comprises at least one of an instant messaging channel of the target application or a channel of a third-party application; and the sending module, configured to: in response to a selection operation on the shareable channel by the user, send the media content to a target share channel selected by the user.

Further, on the basis of any one of the above embodiments, the apparatus further comprises: a jumping module, configured to when a quantity of the designated contact is one, jump the display interface to a chat interface with the designated contact, or jump the display interface to a message detail page; and the jumping module, further configured to when the quantity of the designated contacts is two, jump the display interface to the message detail page.

Another embodiment of the present disclosure further provides an electronic device, comprising: a processor and a memory;

The memory stores computer executable instructions;

The processor executes the computer executable instructions stored in the memory, causing the processor to implement the method of sending media content according to any one of the above embodiments.

The device provided by the embodiments may be used to execute the technical solutions of the above method embodiments. Its implementation principles and technical effects are similar, and will not be described again in the present embodiment.

Another embodiment of the present disclosure further provides a computer-readable storage medium, wherein the computer-readable storage medium stores computer executable instructions, and when a processor executes the computer executable instructions, the method of sending media content according to any one of the above embodiments is implemented.

Another embodiment of the present disclosure further provides a computer program product comprising a computer program, wherein when a processor executes the computer program, the method of sending media content according to any one of the above embodiments is implemented.

In order to implement the above embodiments, the embodiment of the present disclosure further provides an electronic device.

Figure 9:
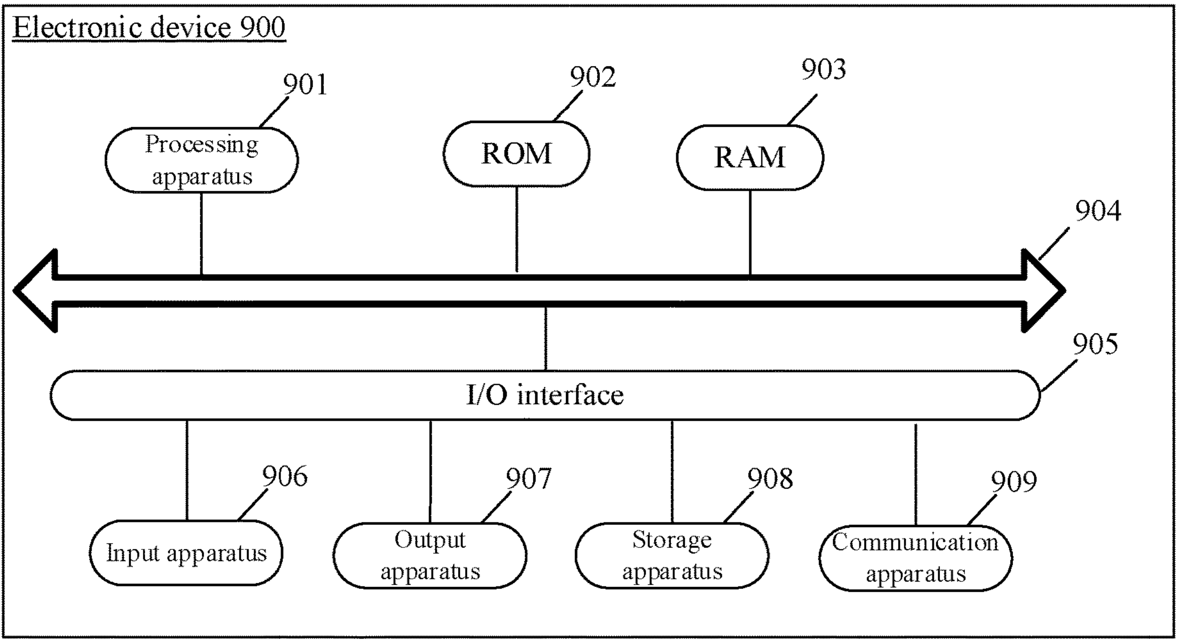
FIG. 9 is a structural schematic diagram of an electronic device provided by embodiment 5 of the present disclosure.

FIG. 9 is a structural schematic diagram of an electronic device provided by embodiment 5 of the present disclosure. As shown in FIG. 9, the electronic device 900 may be a terminal device or a server. Wherein the terminal device may include but is not limited to mobile terminals such as mobile phones, laptops, digital broadcast receivers, personal digital assistants (PDA for short), portable Android devices (PAD for short), portable media players (PMP for short), vehicle-mounted terminals (such as vehicle-mounted navigation terminals), etc., and fixed terminals such as digital televisions (TV for short), desktop computers, etc. The electronic device shown in FIG. 9 is only an example and should not impose any limitations on the functions and scope of use of the embodiments of the present disclosure.

As shown in FIG. 9, the electronic device 900 may include a processing apparatus (such as a central processing unit, a graphic processing unit, etc.) 901, which may perform various appropriate actions and processes according to programs stored in a read-only memory (ROM) 902 or programs loaded from a storage apparatus 908 into a random access memory (RAM) 903. In the RAM 903, various programs and data required for the operation of the electronic device 900 may also be stored. The processing apparatus 901, the ROM 902, and the RAM 903 are connected to each other through a bus 904. An input/output (I/O) interface 905 is also connected to the bus 904.

Typically, the following apparatus may be connected to the I/O interface 905: input apparatus 906 including, for example, a touch screen, a touch pad, a keyboard, a mouse, a camera, a microphone, an accelerometer, a gyroscope, etc.; output apparatus 907 including, for example, a liquid crystal display (LCD for short), a speaker, a vibrator, etc.; storage apparatus 908 including, for example, a magnetic tape, a hard disk, etc.; and communication apparatus 909. The communication apparatus 909 may allow the electronic device 900 to communicate wirelessly or wiredly with other devices to exchange data. Although FIG. 9 illustrates an electronic device 900 having various apparatus, it should be understood that implementation or availability of all illustrated apparatus is not required. More or fewer apparatus may alternatively be implemented or provided.

In particular, according to the embodiments of the present disclosure, the processes described above with reference to the flowchart may be implemented as a computer software program. For example, the embodiments of the present disclosure comprise a computer program product including a computer program carried on a non-transitory computer-readable medium, the computer program containing program code for performing the method illustrated in the flowchart. In such embodiment, the computer program may be downloaded from the network and installed via communication apparatus 909, or be installed from storage apparatus 908, or be installed from the ROM 902. When the computer program is executed by the processing apparatus 901, the above functions defined in the method of the embodiments of the present disclosure are performed.

It should be noted that the above computer-readable medium in the present disclosure may be a computer-readable signal medium or a computer-readable storage medium, or any combination of the above two. The computer-readable storage medium may be, for example, but is not limited to, an electrical, magnetic, optical, electromagnetic, infrared, or semiconductor system, apparatus or device, or any combination thereof. More specific examples of computer-readable storage media may include, but are not limited to: electrical connections having one or more wires, portable computer disks, hard drives, random access memory (RAM), read-only memory (ROM), Erasable Programmable Read-Only Memory (EPROM or flash memory), optical fibers, portable Compact Disc Read-Only Memory (CD-ROM), optical storage devices, magnetic storage devices, or any suitable combination of the above. In the present disclosure, a computer-readable storage medium may be any tangible medium that contains or stores a program for use by or in connection with an instruction execution system, apparatus, or device. In the present disclosure, a computer-readable signal medium may include a data signal propagated in baseband or as part of a carrier wave, carrying computer-readable program code therein. Such propagated data signals may take a variety of forms, including but not limited to electromagnetic signals, optical signals, or any suitable combination of the above. A computer-readable signal medium may further be any computer-readable medium other than a computer-readable storage medium. The computer-readable signal medium can send, propagate, or transmit a program for use by or in connection with an instruction execution system, apparatus, or device. Program code contained on a computer-readable medium may be transmitted using any appropriate medium, including but not limited to: wires, optical cables, Radio Frequency (RF), etc., or any suitable combination of the above.

The above computer-readable medium may be included in the above electronic device; or may exist independently without being assembled into the electronic device.

The above computer-readable medium carries one or more programs. When the above one or more programs are executed by the electronic device, the electronic device is caused to execute the method of the above embodiments.

Computer program code for performing the operations of the present disclosure may be written in one or more programming languages, or a combination thereof. The above programming languages include, but are not limited to, object-oriented programming languages such as Java, Smalltalk, and C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In situations involving remote computers, the remote computer may be connected to the user's computer through any kind of network, including local area network (LAN for short) or wide area network (WAN for short), or may be connected to an external computer (such as through the Internet using an Internet service provider).

The flowcharts and block diagrams in the drawings illustrate the architecture, functionality, and operations of possible implementations of systems, methods, and computer program products according to various embodiments of the present disclosure. In this regard, each block in the flowchart or block diagram may represent a module, segment, or portion of code, containing one or more executable instructions for implementing the specified logical function. It should also be noted that, in some alternative implementations, the functions noted in the block may occur out of the order noted in the drawings. For example, two blocks shown one after another may actually execute substantially in parallel, or they may sometimes execute in the reverse order, depending on the functionality involved. It should also be noted that each block of the block diagram and/or flowchart illustration, and combinations of blocks in the block diagram and/or flowchart illustration, may be implemented by special purpose hardware-based systems that perform the specified functions or operations, or may be implemented using a combination of specialized hardware and computer instructions.

The units involved in the embodiments of the present disclosure may be implemented in software or hardware. The name of a unit in a case does not constitute a qualification of the unit itself. For example, a first acquisition unit may also be described as "a unit that acquires at least two Internet Protocol addresses."

The functions described above herein may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Part (ASSP), System on Chip (SOC), Complex Programmable Logic Device (CPLD), etc.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but are not limited to, electronic, magnetic, optical, electromagnetic, infrared, or semiconductor systems, apparatuses or devices, or any suitable combination of the above. More specific examples of machine-readable storage medium may include an electrical connection based on one or more wires, a portable computer disk, a hard disk, a random access memory (RAM), a read-only memory (ROM), a Erasable Programmable Read-Only Memory (EPROM or flash memory), an optical fiber, a Compact Disc Read-Only Memory (CD-ROM), an optical storage device, a magnetic storage device, or any suitable combination of the above.

In a first aspect, in accordance with one or more embodiments of the present disclosure, a method of sending media content is provided in a target application, comprising:

In a first sending path, in response to an editing completion operation on media content materials, displaying a media content processing interface on a display interface;

In response to a target sending path selection operation that is received on the media content processing interface, determining a target sending path corresponding to media content, wherein the target sending path comprises a first sending path or a second sending path, the first sending path is configured to post content of the target application or the first sending path is an instant messaging path, and the second sending path is a sending path that is different from the first sending path in terms of type and independent of the first sending path; and Generating the media content on the basis of the media content materials, and sending the media content to the target sending path.

In accordance with one or more embodiments of the present disclosure, the first sending path is configured to post the content of the target application and the second sending path is an instant messaging path, or the first sending path is an instant messaging path and the second sending path is configured to post the content of the target application.

In accordance with one or more embodiments of the present disclosure, generating the media content on the basis of the media content materials comprises:

Based on the target sending path, determining a target synthesis processing method corresponding to the target sending path; and Determining attribute information of the synthesized media content based on the target synthesis processing method, and performing synthesis processing on the media content materials based on the attribute information to obtain the synthesized media content.

In accordance with one or more embodiments of the present disclosure, the attribute information of the media content comprises storage-related attribute information and/or transmission-related attribute information.

In accordance with one or more embodiments of the present disclosure, the attribute information of the media content comprises at least one of the following: a file format, a file size, a resolution, or a video encoding format.

In accordance with one or more embodiments of the present disclosure, the media content materials comprise audio and video resource data, editing resource data, and corresponding descriptive file data.

In accordance with one or more embodiments of the present disclosure, the media content processing interface comprises a share icon, and in response to the target sending path selection operation that is received on the media content processing interface, determining the target sending path corresponding to media content comprises:

In response to a triggering operation on the share icon, displaying a path selection interface on the display interface, wherein the path selection interface comprises the first sending path and the second sending path; and In response to a triggering operation on the path selection interface, determining the sending path selected by a user as the target sending path.

In accordance with one or more embodiments of the present disclosure, the media content processing interface comprises a first sending path share icon and a second sending path share icon, and In response to the target sending path selection operation that is received on the media content processing interface, determining the target sending path corresponding to media content comprises:

In response to a triggering operation on the first sending path share icon or the second sending path share icon, determining the first sending path or the second sending path corresponding to the first sending path share icon or the second sending path share icon as the target sending path.

In accordance with one or more embodiments of the present disclosure, the target sending path is an instant messaging path, and after in response to the target sending path selection operation that is received on the media content processing interface, determining the target sending path corresponding to media content, the method further comprises:

Displaying a contact list on the display interface; and

Based on a selection operation by the user in the contact list, determining at least one contact selected by the user as a designated contact; and Generating the media content on the basis of the media content materials, and sending the media content to the target sending path comprises:

Generating the media content on the basis of the media content materials, and sending the media content to an instant conversation with at least one designated contact.

In accordance with one or more embodiments of the present disclosure, after based on the selection operation by the user in the contact list, determining the at least one contact selected by the user as the designated contact, the method further comprises:

Displaying a shareable channel corresponding to the designated contact on the display interface, wherein the shareable channel comprises at least one of an instant messaging channel of the target application or a channel of a third-party application; and Sending the media content to the target sending path comprises:

In response to a selection operation on the shareable channel by the user, sending the media content to a target share channel selected by the user.

In accordance with one or more embodiments of the present disclosure, after sending the media content to the target sending path, the method further comprises:

When a quantity of the designated contact is one, jumping the display interface to a chat interface with the designated contact, or jumping the display interface to a message detail page; and When the quantity of the designated contacts is two, jumping the display interface to the message detail page.

In a second aspect, in accordance with one or more embodiments of the present disclosure, an apparatus of sending media content is provided, comprising:

A display module, configured to, in a first sending path, in response to an editing completion operation on media content materials, display a media content processing interface on a display interface;

A determination module, configured to, in response to a received target sending path selection operation that is received on the media content processing interface, determine a target sending path corresponding to media content, wherein the target sending path comprises a first sending path or a second sending path, the first sending path is configured to post content of the target application or the first sending path is an instant messaging path, and the second sending path is a sending path that is different from the first sending path in terms of type and independent of the first sending path; and A sending module, configured to generate the media content on the basis of the media content materials, and send the media content to the target sending path.

In accordance with one or more embodiments of the present disclosure, the first sending path is configured to post the content of the target application and the second sending path is an instant messaging path, or the first sending path is an instant messaging path and the second sending path is configured to post the content of the target application.

In accordance with one or more embodiments of the present disclosure, the sending module is configured to:

Based on the target sending path, determine a target synthesis processing method corresponding to the target sending path; and Determine attribute information of the synthesized media content based on the target synthesis processing method, and perform synthesis processing on the media content materials based on the attribute information to obtain the synthesized media content.

In accordance with one or more embodiments of the present disclosure, the attribute information of the media content comprises storage-related attribute information and/or transmission-related attribute information.

In accordance with one or more embodiments of the present disclosure, the attribute information of the media content comprises at least one of the following: a file format, a file size, a resolution, or a video encoding format.

In accordance with one or more embodiments of the present disclosure, the media content materials comprise audio and video resource data, editing resource data, and corresponding descriptive file data.

In accordance with one or more embodiments of the present disclosure, the media content processing interface comprises a share icon, and the determination module is configured to:

In response to a triggering operation on the share icon, display a path selection interface on the display interface, wherein the path selection interface comprises the first sending path and the second sending path; and In response to a triggering operation on the path selection interface, determine the sending path selected by a user as the target sending path.

In accordance with one or more embodiments of the present disclosure, the media content processing interface comprises a first sending path share icon and a second sending path share icon, and The Determination Module is Configured to:

In response to a triggering operation on the first sending path share icon or the second sending path share icon, determine the first sending path or the second sending path corresponding to the first sending path share icon or the second sending path share icon as the target sending path.

In accordance with one or more embodiments of the present disclosure, the apparatus further comprises:

The display module, further configured to display a contact list on the display list;

The determination module, further configured to, based on a selection operation by the user in the contact list, determine at least one contact selected by the user as a designated contact; and The Sending Module, Configured to:

Generate the media content on the basis of the media content materials, and send the media content to an instant conversation with at least one designated contact.

In accordance with one or more embodiments of the present disclosure, the apparatus further comprises:

The display module, further configured to display a shareable channel corresponding to the designated contact on the display interface, wherein the shareable channel comprises at least one of an instant messaging channel of the target application or a channel of a third-party application; and The Sending Module, Configured to:

In response to a selection operation on the shareable channel by the user, send the media content to a target share channel selected by the user.

In accordance with one or more embodiments of the present disclosure, the apparatus further comprises:

A jumping module, configured to when a quantity of the designated contact is one, jump the display interface to a chat interface with the designated contact, or jump the display interface to a message detail page; and The jumping module, further configured to when the quantity of the designated contacts is two, jump the display interface to the message detail page.

In a third aspect, in accordance with one or more embodiments of the present disclosure, an electronic device is provided, comprising: at least one processor and a memory;

The memory stores computer executable instructions;

The at least one processor executes the computer executable instructions stored in the memory, causing the at least one processor to implement the method of sending media content according to the first aspect and various possible designs of the first aspect.

In a fourth aspect, in accordance with one or more embodiments of the present disclosure, a computer-readable storage medium is provided, wherein the computer-readable storage medium stores computer executable instructions, and when a processor executes the computer executable instructions, the method of sending media content according to the first aspect and various possible designs of the first aspect is implemented.

In a fifth aspect, in accordance with one or more embodiments of the present disclosure, a computer program product is provided, comprising a computer program, wherein when the computer program is executed by a processor, the method of sending media content according to the first aspect and various possible designs of the first aspect is implemented.

In a sixth aspect, in accordance with one or more embodiments of the present disclosure, a computer program is provided, wherein when a processor executes the computer program, the method of sending media content according to the first aspect and various possible designs of the first aspect is implemented.

The above description is only a description of the preferred embodiments of the present disclosure and the technical principles applied. Those skilled in the art should understand that the disclosure scope involved in the present disclosure is not limited to technical solutions formed by specific combinations of the above technical features, but should also cover other technical solutions may be formed by any combination of the above technical features or their equivalent features without departing from the above disclosed concept. For example, a technical solution is formed by replacing the above features with (but not limited to) technical features with similar functions disclosed in the present disclosure.

Furthermore, although operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described using language specific to structural features and/or method logical acts, it should be understood that the subject matter defined in the appended claims is not necessarily limited to the specific features or acts described above. Rather, the specific features and acts described above are merely exemplary forms of implementing the claims.

What is claimed is:

1. A method of sending media content, comprising:

via a first sending path, receiving an editing operation on media content materials, and obtaining the media content;

displaying the media content on a media content processing interface;

in response to a target sending path selection that is received on the media content processing interface, determining a target sending path corresponding to the media content, wherein the target sending path comprises the first sending path or a second sending path, the first sending path is configured to post the media content or is an instant messaging path, the second sending path and the first sending path are different types, and the second sending path is independent of the first sending path; and sending the media content via the target sending path.

2. The method of claim 1, wherein sending the media content via the target sending path comprises:

based on the target sending path, determining a target synthesis processing method corresponding to the target sending path; and determining attribute information of the media content based on the target synthesis processing method, and performing synthesis processing on the media content materials based on the attribute information to obtain the media content.

3. The method of claim 2, wherein the attribute information of the media content comprises storage-related attribute information and/or transmission-related attribute information.

4. The method of claim 3, wherein the attribute information of the media content comprises at least one of the following: a file format, a file size, a resolution, or a video encoding format.

5. The method of claim 1, wherein the target sending path is an instant messaging path, and after in response to the target sending path selection that is received on the media content processing interface, determining the target sending path corresponding to the media content, the method further comprises:

displaying a contact list on the media content processing interface;

based on a selection operation by a user in the contact list, determining at least one contact selected by the user as a designated contact, and wherein sending the media content via the target sending path comprises:

sending the media content to an instant conversation with at least one designated contact.

6. The method of claim 5, wherein, after based on the selection operation by the user in the contact list, determining the at least one contact selected by the user as the designated contact, the method further comprises:

displaying a shareable channel corresponding to the designated contact on the media content processing interface, wherein the shareable channel comprises at least one of an instant messaging channel or a channel of a third-party application, and wherein sending the media content via the target sending path comprises:

in response to a selection operation on the shareable channel by the user, sending the media content via a target share channel selected by the user.

7. The method of claim 5, wherein, after sending the media content via the target sending path, the method further comprises:

when a quantity of the designated contact is one, jumping the media content processing interface to a chat interface with the designated contact, or jumping the media content processing interface to a message detail page; and when the quantity of the designated contacts is two, jumping the media content processing interface to the message detail page.

8. The method of claim 1, wherein the first sending path is configured to post the media content and the second sending path is an instant messaging path, or the first sending path is an instant messaging path and the second sending path is configured to post the media content.

9. The method of claim 1, wherein the media content materials comprise audio and video resource data, editing resource data, and corresponding descriptive file data.

10. The method of claim 1, wherein the media content processing interface comprises a share icon, and wherein in response to the target sending path selection that is received on the media content processing interface, determining the target sending path corresponding to the media content comprises:

in response to a triggering operation on the share icon, displaying a path selection interface on the media content processing interface, wherein the path selection interface comprises the first sending path and the second sending path; and in response to a triggering operation on the path selection interface, determining a sending path selected by a user from the first sending path and the second sending path as the target sending path.

11. The method of claim 1, wherein the media content processing interface comprises a first sending path share icon and a second sending path share icon, and wherein in response to the target sending path selection that is received on the media content processing interface, determining the target sending path corresponding to the media content comprises:

in response to a triggering operation on the first sending path share icon or the second sending path share icon, determining the first sending path or the second sending path corresponding to the first sending path share icon or the second sending path share icon as the target sending path.

12. An electronic device, comprising: a processor and a memory; wherein the memory stores computer executable instructions; and the processor executes the computer executable instructions stored in the memory, causing the electronic device to:

via a first sending path, receive an editing operation on media content materials, and obtaining media content;

display the media content on a media content processing interface;

in response to a target sending path selection that is received on the media content processing interface, determine a target sending path corresponding to the media content, wherein the target sending path comprises the first sending path or a second sending path, the first sending path is configured to post the media content or is an instant messaging path, the second sending path and the first sending path are of different types, and the second sending path is independent of the first sending path; and sending the media content via the target sending path.

13. The electronic device of claim 12, wherein the electronic device being caused to send the media content via the target sending path comprises being caused to:

based on the target sending path, determine a target synthesis processing method corresponding to the target sending path; and determine attribute information of the media content based on the target synthesis processing method, and perform synthesis processing on the media content materials based on the attribute information to obtain the media content.

14. The electronic device of claim 13, wherein the attribute information of the media content comprises storage-related attribute information and/or transmission-related attribute information.

15. The electronic device of claim 14, wherein the attribute information of the media content comprises at least one of the following: a file format, a file size, a resolution, or a video encoding format.

16. The electronic device of claim 12, wherein the first sending path is configured to post the media content and the second sending path is an instant messaging path, or the first sending path is an instant messaging path and the second sending path is configured to post the media content.

17. The electronic device of claim 12, wherein the media content materials comprise audio and video resource data, editing resource data, and corresponding descriptive file data.

18. The electronic device of claim 12, wherein the media content processing interface comprises a share icon, and wherein the electronic device being caused to in response to the target sending path selection that is received on the media content processing interface, determine the target sending path corresponding to the media content, comprises being caused to:

in response to a triggering operation on the share icon, display a path selection interface on the media content processing interface, wherein the path selection interface comprises the first sending path and the second sending path; and in response to a triggering operation on the path selection interface, determine a sending path selected by a user from the first sending path and the second sending path as the target sending path.

19. The electronic device of claim 12, wherein the media content processing interface comprises a first sending path share icon and a second sending path share icon, and wherein the electronic device being caused to in response to the target sending path selection that is received on the media content processing interface, determine the target sending path corresponding to the media content, comprises being caused to:

in response to a triggering operation on the first sending path share icon or the second sending path share icon, determine the first sending path or the second sending path corresponding to the first sending path share icon or the second sending path share icon as the target sending path.

20. A non-transitory computer-readable storage medium, wherein the computer-readable storage medium stores computer executable instructions, and when a processor executes the computer executable instructions, the computer executable instructions cause the processor to:

via a first sending path, receive an editing operation on media content materials, and obtaining media content;

display the media content on a media content processing interface;

in response to a target sending path selection that is received on the media content processing interface, determine a target sending path corresponding to the media content, wherein the target sending path comprises the first sending path or a second sending path, the first sending path is configured to post the media content or is an instant messaging path, the second sending path and the first sending path are of different types, and the second sending path is independent of the first sending path; and sending the media content via the target sending path.

* * * * *